United States Patent [19]

Delle Donne

[11] 4,394,759

[45] Jul. 19, 1983

[54] TRANSMITTING SECTION OF PCM STATION

[75] Inventor: Roberto Delle Donne, Milan, Italy

[73] Assignee: Italtel Societa Italiana Telecomunicazioni S.p.A., Milan, Italy

[21] Appl. No.: 278,064

[22] Filed: Jun. 29, 1981

[30] Foreign Application Priority Data

Jun. 30, 1980 [IT] Italy .............................. 23105 A/80

[51] Int. Cl.³ ............................ H04J 3/12; H04J 3/14
[52] U.S. Cl. ................................. 370/110.1; 370/111; 370/13
[58] Field of Search .................. 370/13, 14, 63, 110.1, 370/58, 62, 68, 111

[56] References Cited

U.S. PATENT DOCUMENTS

| | | | |
|---|---|---|---|
| 4,064,369 | 12/1977 | Battocletti | 370/14 |
| 4,081,611 | 3/1978 | Bovo et al. | 370/63 |
| 4,268,722 | 5/1981 | Little et al. | 370/110.1 |

Primary Examiner—Douglas W. Olms
Attorney, Agent, or Firm—Karl F. Ross; Herbert Dubno

[57] ABSTRACT

A transmitting section of a PCM station in a telecommunication system, embodied in an integrated-circuit chip, comprises a channel-forming circuit receiving a stream of data bits to be organized into a succession of outgoing frames each consisting of a series of channels containing respective 8-bit words or bytes. A multiplexer in the channel former replaces part of a received byte assigned to the No. 0 channel of each frame, including its second and third bits, with certain bits to be included in two alignment words A and B respectively transmitted to a remote terminal at the beginning of alternate frames. The third bit of word B is high when a malfunction is detected or when the replaced second and third bits of the corresponding byte have certain configurations detected by a decoder, calling either for the closure of a loop between the local transmitting and receiving sections or for the monitoring of the PCM line extending to the remote terminal. The latter operation is controlled by a remote-supervision circuit which, in response to either of two such bit configurations, causes the bits of one or more frames to be sent out in either of two representations selectively established by an associated coder.

12 Claims, 2 Drawing Figures

TRANSMITTING SECTION OF PCM STATION

FIELD OF THE INVENTION

My present invention relates to a PCM station of a telecommunication system and, more particularly, to a transmitting section of such a station designed to send messages pertaining to a multiplicity of communication channels in a time-division-multiplex (TDM) mode to a remote terminal.

BACKGROUND OF THE INVENTION

In commonly owned U.S. Pat. No. 4,081,611 there has been disclosed a PCM station of this type, acting as a coupling network or transit exchange between incoming and outgoing links, in which arriving messages are fed to a line unit via a receiving interface while departing messages pass through a transmitting interface. Between these two interfaces the line unit includes, inter alia, a malfunction detector which is controlled by a timing circuit and can send alarm signals to an insertion circuit enabling their interpolation with outgoing message signals. The station dialogues with a central processor which supervises its operation and sends instructions concerning the connections to be established.

In conformity with international regulations, data transmitted in such a PCM/TDM telecommunication system are organized in a succession of frames each consisting of a multiplicity of channels accommodating respective multibit words, usually 8-bit bytes; a channel may be defined as a time slot subdivided into n clock cycles or phases. For proper synchronization of clocks controlling the operations at the transmitting and at the receiving end of a signal path, certain alignment words are used in an initial channel of each frame (referred to hereinafter as the No. 0 channel). These alignment words generally differ from each other in odd-numbered or "first" and even-numbered or "second" frames; thus, they will alternately assume two different forms referred to hereinafter as "word A" and "word B". Word A, appearing in the No. 0 channel of the recurrent first frame, may have a large number of its bits (e.g. 7 out of 8) arranged in an invariable configuration; word B, present in the No. 0 channel of the immediately following second frame, need only have one particular bit in a predetermined time position.

When data to be sent out from such a station (e.g. in response to instructions from the processor) have not yet been organized into frames, bytes assigned to the No. 0 channel will have to be given bit configurations conforming to these alignment words. Bits not included in the invariable configurations can still be used, however, to carry information to the remote terminal.

OBJECTS OF THE INVENTION

An object of my present invention is to provide means in such a PCM station for enabling the use of certain data words, assigned to the No. 0 channel of an outgoing frame, for the conveyance of internal switching instructions to the transmitting section of the station before the transformation of these data words into an alignment word A or B, these instructions utilizing one or more bits which are replaced in the transformation so as not to appear in the alignment word sent to the remote terminal.

A more particular object is to provide means selectively controlled by these instructions for generating supervisory signals of various kinds, specifically a loop command for the establishment of a closed circuit within the PCM station and a remote-supervision command for the testing of conventional regenerators inserted in the line connecting the PCM station to the remote terminal.

SUMMARY OF THE INVENTION

A transmitting section of a PCM station according to my invention comprises channel-forming means for organizing multibit data words into alternating first and second outgoing frames as described above, timing means stepped by a local clock for identifying the No. 0 channel of each frame and controlling the channel-forming means to replace certain parts of a data word in that channel by predetermined bit yielding the partly invariable alignment words A and B, decoding means emitting supervisory instructions upon detecting certain bit groupings in a data word assigned to such a channel, and switching means connected to the decoding means for generating internal signals in response to the supervisory instructions thus emitted, the channel-forming means being connected to the switching means for modifying a bit in one of the alignment words (specifically word B) in the presence of these instructions.

Pursuant to a more particular feature of my invention, the channel-forming means comprises a series/parallel converter with n stages (n being preferably equal to 8) accommodating respective bits of an n-bit data word successively arriving at an input thereof, a parallel/series converter with n stages and with a series input connected to a first stage output of the series/parallel converter for sequential loading with the bits of an arriving data word, and a multiplexer with n outputs connected to respective stage inputs of the parallel/series converter and with a plurality of inputs connected to respective stage outputs of the series/parallel converter. Additional inputs of the multiplexer are connected to points of fixed potential reflecting predetermined logical values, the timing means emitting a channel-designating signal which blocks the sequential loading of the parallel/series converter in the No. 0 channel of each frame while enabling the parallel loading thereof via the n multiplexer outputs. Some of these multiplexer outputs are switched to certain of the additional inputs thereof, under the control of a frame-designating signal emitted by the timing means, during the No. 0 channel of the first frame (referred to hereinafter as frame $F_A$) and to other of these additional inputs during the No. 0 channel of the second frame (referred to hereinafter as frame $F_B$) while other multiplexer outputs are left connected to the associated stage outputs of the series/parallel converter; the parallel/series converter has an output for sequentially reading out the bits loaded into its stages during any channel of each frame $F_A$, $F_B$.

In accordance with another feature of my invention, a plurality of the data inputs of the decoding means are connected to the stage outputs of the series/parallel converter while an enabling input thereof is connected to the timing means in order that the decoding means may receive the contents of corresponding stages of that converter in the presence of the channel-designating signal, i.e. during the No. 0 channel of any frame. The switching means advantageously includes a flip-flop settable by a specific bit combination in these converter stages for emitting a loop command, as described above, and further includes logic circuitry operable in response to at least one other bit combination in these stages for emitting a remote-supervision command which modifies the operation of a message coder receiving the bits that are sequentially read out from the parallel/series converter.

BRIEF DESCRIPTION OF THE DRAWING

The above and other features of my invention will now be described in detail with reference to the accompanying drawing in which.

SPECIFIC DESCRIPTION

Figure 1:
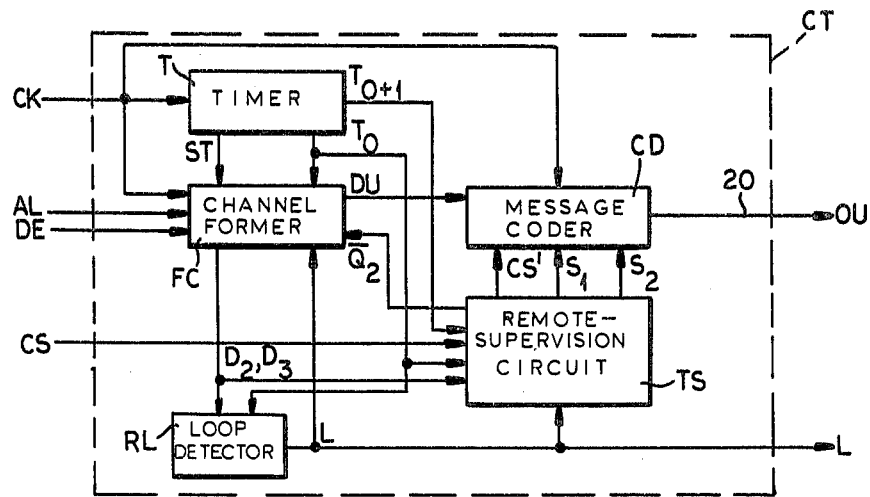
FIG. 1 is a block diagram of a transmitting section of a PCM station embodying my invention.

As shown in FIG. 1, a transmitting section CT of a PCM station according to my invention comprises a timer T, a channel former FC, a loop detector RL, a message coder CD and a remote-supervision circuit TS. All these components are preferably embodied in a single integrated-circuit chip.

Timer T, essentially consisting of a counter, is stepped by locally generated clock pulses CK and emits various clock signals in the course of a two-frame counting cycle, namely a channel-designation signal $T_0$ during the No. 0 channel of each frame, a timing signal $T_{0+1}$ during the No. 0 and No. 1 channels thereof, and a frame-designating signal ST discriminating between the first frame $F_A$ and the second frame $F_B$ of each cycle. The clock pulses CK also go to the channel former FC and to the message coder CD; channel-designating signal $T_0$ is transmitted to components FC, RL and TS, the latter also receiving the timing signal $T_{0+1}$. The frame-designating signal ST is fed only to the channel former FC which furthermore receives a "raw" bit stream DE as well as an alarm signal AL generated by a malfunction detector. The data of bit stream DE may come from any source not provided with its own channel former. The malfunction detector could be of the type disclosed in my concurrently filed application Ser. No. 278,065. A loop command L emitted by detector RL, in response to certain bits $D_2$, $D_3$ of a data word recognized in channel former FC, controls a nonillustrated switching stage designed to establish a closed circuit between the transmitting and receiving sections of the PCM station for self-checking purposes; command L is also delivered to circuits FC and TS. The latter circuit receives, in addition to the bits $D_2$, $D_3$ emitted by channel former FC, a control signal CS from a nonillustrated instruction decoder connected to the associated processor; signal CS, when retransmitted by circuit TS as a signal CS', determines the mode of operation of coder CD as more fully described hereinafter. When signal CS is blocked, this mode of operation is controlled by two signals $S_1$ and $S_2$ selectively generated by circuit TS. Data bits DU, constituting bytes organized into frames by channel former FC, are translated by coder CD into outgoing messages OU on a lead 20.

The incoming bit stream DE may be generated under the control of the processor by a microprogram executing a test routine. During remote-supervision operations, in which the processor checks on signals sent back from the line regenerator under test in response to outgoing code words, a corresponding command generated within circuit TS gives rise to a signal $\overline{Q_2}$ delivered to channel former FC.

Figure 2:
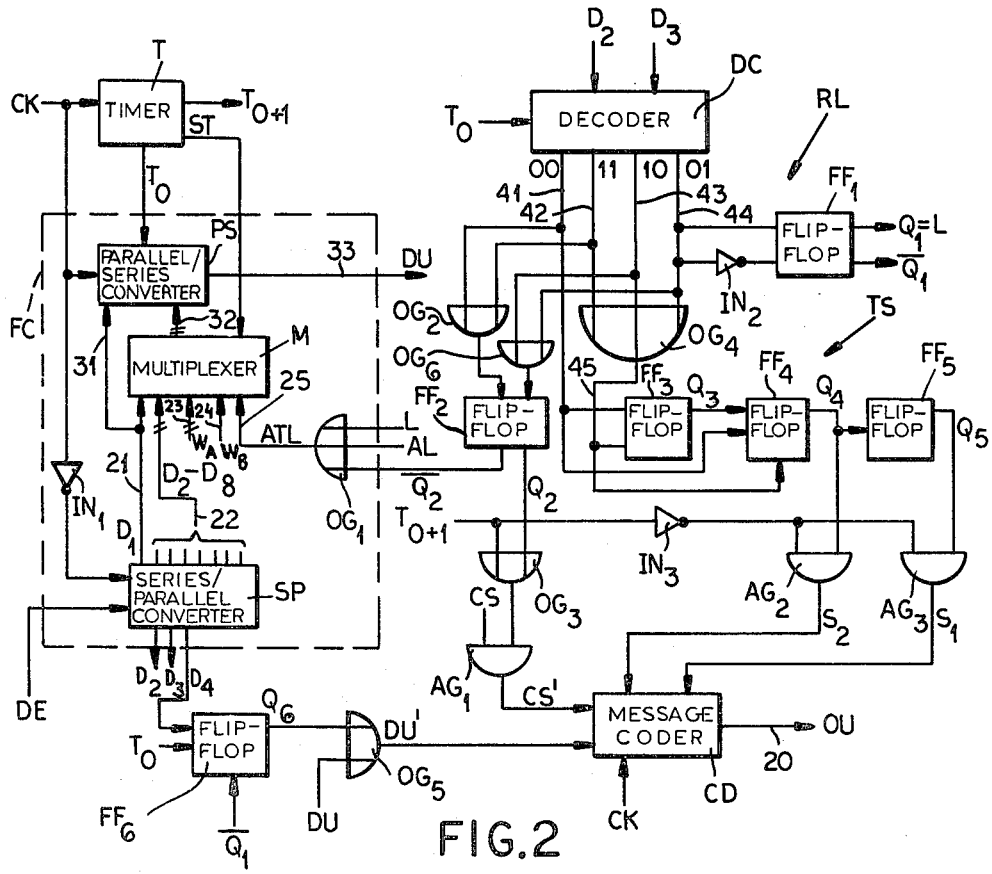
FIG. 2 shows details of certain components of the transmitting section illustrated in FIG. 1.

Reference will now be made to FIG. 2 for a more detailed description of components FC, RL and TS. Channel former FC comprises a series/parallel converter SP, a parallel/series converter PS, and a multiplexer M switchable by the frame-designating signal ST from timer T. Each converter essentially consists of an 8-stage shift register. Clock pulses CK are fed directly to the output register constituted by converter PS and via an inverter $IN_1$ to the input register constituted by converter SP whereby, in any time slot other than the one assigned to the No. 0 channel of a frame by timer T, the two converters are alternately stepped eight times per time slot. Under these circumstances, all bits of the incoming stream DE are immediately read out via a first stage output 21 of converter SP to a corresponding stage input 31 of converter PS whose stages are thus serially loaded. During the time slot assigned to the No. 0 channel, signal $T_0$ from timer T inhibits such serial loading but enables the eight stages of converter PS to be loaded in parallel via multiplexer M. An extension of lead 21 and a 7-lead multiple 22 carry the contents of all the stages of converter SP, i.e. bits $D_1$–$D_8$, to respective inputs of multiplexer M from whose eight outputs an 8-lead multiple 32 extends to all the stage inputs of converter PS. In frame $F_A$, however, multiplexer M is switched by the binary signal ST into a position in which seven of its outputs are connected to respective leads of another 7-lead input multiple 23 to which fixed potentials of predetermined logical values "0" and "1" are applied in an invariable pattern $W_A$. In a specific instance, this pattern has the configuration of 0-0-1-1-0-1-1. Parallel loading, enabled by the trailing edge of signal $T_0$ in the final phase of the No. 0 channel of frame $F_A$, will then introduce only the bit $D_1$ from the first stage of converter SP along with a predetermined 7-bit combination from multiple 23 into respective stages of converter PS whereby an alignment word A is formed. With the disappearance of signal $T_0$, the eight bits of the alignment word are sequentially read out on a lead 33 as part of the sequence DU, followed by data words serially loaded in the aforedescribed manner via lead 21 into converter PS during the remaining time slots of that frame.

When the No. 0 channel of frame $F_B$ arrives, signal $T_0$ again inhibits the serial loading of converter PS while the stages of converter SP are being filled with bits $D_1$–$D_8$ of a data word then arriving. With signal ST now in its alternate state, multiplexer M connects two of its outputs—specifically the second and third of the group tied to multiple 32—to inputs other than those served by mutliple 22, namely two inputs respectively connected to a pair of leads 24 and 25. Lead 24 is connected to a source $W_B$ of fixed potential of logical value "1". Lead 25 extends from an OR gate $OG_1$ carrying a signal ATL of logical value "0" or "1" as described below. Thus, an alignment word B loaded in parallel into the stages of converter PS in the final phase of No. 0 channel of frame $F_B$ has an invariable bit "1" in second position while the bit in its third positon depends on the signal ATL. Therefore, words A and B will have the following configuration:

TABLE

|  | $D_1$ | $D_2$ | $D_3$ | $D_4$ | $D_5$ | $D_6$ | $D_7$ | $D_8$ |
| --- | --- | --- | --- | --- | --- | --- | --- | --- |
| Word A | X | 0 | 0 | 1 | 1 | 0 | 1 | 1 |
| Word B | X | 1 | ATL | X | X | X | X | X |

The letter X in the foregoing Table indicates digits of either logical value read out from converter SP via lead 21 and multiple 22. Since bits $D_2$ and $D_3$ are never transferred from converter SP to converter PS via multiplexer M in the present instance, the corresponding leads may be omitted in multiple 22.

Since ATL, designed to alert the remote terminal to a special situation in the PCM station here considered, is high whenever one of the aforedescribed signals L, AL and $\overline{Q_2}$ appears on a respective input of OR gate $OG_1$. When the presence of bit ATL=1 in alignment word B is detected at the remote terminal receiving the outgoing messages OU, e.g. by circuitry such as that described in my concurrently filed application Ser. No. 278,065, that terminal may send back alignment words of its own also containing such an alerting bit ATL. If desired, the closure of an internal loop in response to command L may be communicated to the remote terminal in a more distinctive way, as by a blanking of the outgoing message bits DU in response to a specific bit $D_4$ read out from converter SP as described hereinafter; in that case, the loop command L need not be fed to OR gate $OG_1$.

Loop detector RL and remote-supervision circuit TS are shown in FIG. 2 to be provided with a common decoder DC which is enabled by the channel-designating signal $T_0$ and has two data inputs receiving the bits $D_2$ and $D_3$ from the corresponding stages of converter SP. Decoder DC has four output leads 41, 42, 43, 44 which are respectively energized when bits $D_2$ and $D_3$ have configurations "00", "11", "10" and "01". High voltage on lead 44 sets a flip-flop $FF_1$ which is reset through an inverter $IN_2$ when that voltage goes low. In its set state, flip-flop $FF_1$ emits a signal $Q_1$ constituting the loop command L. Energization of lead 41 or 42 establishes one of two possible remote-supervision routines and causes, via an OR gate $OG_2$, the resetting of a flip-flop $FF_2$ which is otherwise set, via an OR gate $OG_6$, by voltage on lead 43 or 44. When reset, flip-flop $FF_2$ emits the aforementioned signal $\overline{Q_2}$ to OR gate $OG_1$; in its set state, flip-flop $FF_2$ transmits an output signal $Q_2$ through an OR gate $OG_3$ to one input of an AND gate $AG_1$ which is thereby enabled to pass the mode-control signal CS referred to in connection with FIG. 1. OR gate $OG_3$ also has an input receiving the timing signal $T_{0+1}$ during the No. 0 and No. 1 channels of the frame.

AND gate $AG_1$, when conducting, delivers the signal CS' to message coder CD to establish one or the other mode of operation thereof, depending on the logical value of signal CS. This signal, therefore, controls the coder CD during the first two channels of any frame, irrespectively of the state of flip-flop $FF_2$. Coder CD, stepped by the clock pulses CK, receives the outgoing bits DU as bits DU' through an OR gate $OG_5$ and translates them into, say, a pseudo-ternary representation known as AMI (for "alternate mark inversion") when operating in its first mode; in its second mode, the representation may be of another pseudo-ternary type such as that known as HDB3 in which the rule of alternate mark inversion is violated in a well-defined manner. Reference may be made to annex 1 of CCITT Recommendation G.703 for a more detailed description of codes AMI and HDB3.

Circuit TS comprises three cascaded flip-flops $FF_3$, $FF_4$ and $FF_5$. Flip-flop $FF_3$ is of JK type with a setting input tied to lead 41 and a resetting input joined to an output lead 45 of an OR gate $OG_4$ with three inputs respectively connected to leads 42, 43 and 44. Flip-flop $FF_4$ is of D type with a clock input connected to lead 41, a data input connected to the set output of flip-flop $FF_3$ carrying a signal $Q_3$, and a resetting input connected to lead 45. Flip-flop $FF_5$ is of the set/reset type with a switching input joined to the set output of flip-flop $FF_4$ carrying a signal $Q_4$. The set outputs of flip-flops $FF_4$ and $FF_5$ extend to respective inputs of two AND gates $AG_2$ and $AG_3$ which have other inputs receiving the negated timing signal $\overline{T_{0+1}}$ through an inverter $IN_3$; these AND gates, when conducting, respectively emit signals $S_1$ and $S_2$ to a pair of control inputs of coder CD.

As long as neither of leads 41 and 42 is energized in the first time slot of a frame, i.e. during the No. 0 channel thereof marked by the presence of signal $T_0$, flip-flop $FF_2$ remains set whereby AND gate $AG_1$ is permanently enabled to give passage to the control signal CS; that signal, accordingly, then dictates the mode of operation of coder CD also in all the later channels of the frame.

If an instruction for the initiation of remote supervision causes bits $D_2$ and $D_3$ to assume the configuration "00" or "11" in the No. 1 channel, the resetting of flip-flop $FF_2$ blocks the AND gate $AG_1$ after the end of the No. 1 channel. If lead 41 is energized in the first time slot, by a pulse coextensive with signal $T_0$, flip-flop $FF_4$ (assumed to have been previously reset by voltage on lead 45) is not switched since flip-flop $FF_3$ is set only by the trailing edge of that pulse. When the same pluse on lead 41 recurs at the beginning of the next frame, signal $Q_3$ is already in existence so that flip-flop $FF_4$ is set to generate signal $Q_4$. In the first frame of a remote-supervision routine commanded by a bit combination "00", therefore, AND gate $AG_2$ is cut off whereas AND gate $AG_3$ may or may not be conducting after the second time slot, depending on the state last reached by flip-flop $FF_5$. With mode-changing signal $S_2=0$, coder CD will operate in its first mode (AMI) regardless of the value of signal $S_1$ as long as AND gate $AG_1$ is blocked to cut off the control signal CS; it should be noted, however, that signal $S_2$ would be overridden by signal CS'=1 when gate $AG_1$ conducts to establish the second mode (HDB3). In the following frames, as long as the pulse on lead 41 recurs during the No. 0 channel thereof, the presence of signal $Q_4$ makes $S_1=1$ after the No. 1 channel; this establishes the second mode of operation. Since the appearance of signal $Q_4$ has reversed the flip-flop $FF_5$, signal $S_1$ has changed its logical value; this signal is relevant only for the second mode by determining the polarity of the violation of the alternate-mark-inversion rule discussed above. Thus, a subsequent recurrence of the same remote-supervision routine (with intervening resetting of flip-flops $FF_3$ and $FF_4$ by a pulse on any of the other decoder outputs) will result in a variation of mode HDB3 compared with the previous instance. If such a variation is not required, flip-flop $FF_5$ and gate $AG_3$ can be omitted.

If the remote-supervision routine is commanded by the bit combination "11", the pulse on lead 42 resets (or holds reset) the flip-flop $FF_3$ so that neither signal $Q_3$ nor signal $Q_4$ will appear in any frame. Mode AMI is then established in each frame, at least from the third time slot on.

Coder CD may be divided into two parts to which the outgoing bits DU' are fed in parallel for transformation into the AMI and the HDB3 representation, respectively, one or the other part being switched to its output 20 by a multiplexer responsive in the aforedescribed manner to signals CS' and $S_2$. Signal $S_1$ will then control only the operation of the part generating the HDB3 mode.

FIG. 2 further shows a D-type flip-flop $FF_6$ whose clock input receives the signal $T_0$ and whose data input is connected to the fourth stage of converter SP carrying the bit $D_4$. The set output of flip-flop $FF_6$ is connected to another input of OR gate $OG_5$ giving passage to the outgoing bits DU. In the absence of a loop command L, flip-flop $FF_6$ is inhibited by a signal $\overline{Q_1}$ fed to its resetting input from the reset input of flip-flop $FF_1$. When a loop command is generated, flip-flop $FF_6$ responds to the trailing edge of signal $T_0$ to emit a signal $Q_6$ to OR gate $OG_5$ if at that instant the bit $D_4$ has the logical value "1". Signal $Q_6$ then blanks the bits DU since the output lead of OR gate $OG_5$ will feed a continuous high voltage to the data input of coder CD until command L disappears and/or $D_4=0$ in the No. 0 channel of a subsequent frame. It will be apparent that similar blanking effects can be obtained by replacing OR gate $OG_5$ with an AND gate having an input connected to the reset output of flip-flop $FF_6$, for example.

Coder CD could be part of a transmitting interface of a line unit, such as that shown at IT in FIG. 6 of the aforementioned U.S. Pat. No. 4,081,611, if the bit stream DU' is interleaved with message frames arriving from another remote terminal at the associated receiving section and passing through a switching matrix (such as that shown at RS in the patent referred to) to an insertion circuit (CI) disposed between gate $OG_5$ and the coder.

I claim:

1. A transmitting section of a PCM station of a telecommunication system, comprising:
    channel-forming means for organizing n-bit data words into alternating first and second outgoing frames each containing a multiplicity of channels accommodating respective data words, said channel-forming means including an input register with n stages accommodating respective bits of an arriving data word loaded into same, an output register with n stages, and a multiplexer with n outputs connected to respective stage inputs of said output register and with a plurality of inputs connected to respective stage outputs of said input register, said multiplexer having additional inputs connected to points of fixed potential representing predetermined logical values;
    timing means stepped by a local clock for identifying an initial channel No. 0 of each frame and controlling said multiplexer to replace certain bits of a data word in the No. 0 channel of each frame by predetermined bits yielding partly invariable alignment words A and B loaded into said output register in said first and second frames, respectively, said timing means emitting a frame-designating signal switching part of the outputs of said multiplexer to certain of said additional inputs thereof during the No. 0 channel of said second frames while leaving other multiplexer outputs connected to the associated stage outputs;
    decoding means emitting supervisory instructions upon detecting certain bit groupings in a data word loaded into said input register in the No. 0 channel of a frame; and
    switching means connected to said decoding means for generating internal signals in response to said supervisory instructions, said multiplexer being further controlled by said switching means for modifying a bit in one of said alignment words in the presence of said supervisory instructions.

2. A transmitting section as defined in claim 1 wherein said input register is a series/parallel converter and said output register is a parallel/series converter with a series input connected to a first stage output of said series/parallel converter for sequential loading with the bits of an arriving data word, said timing means further emitting a channel-designating signal blocking the sequential loading of said parallel/series converter in the No. 0 channel of each frame while enabling the parallel loading thereof via the n outputs of said multiplexer, said parallel/series converter having an output for sequentially reading out the bits loaded into the stages thereof during any channel of each frame.

3. A transmitting section as defined in claim 2 wherein said multiplexer has a further input connected to said switching means for receiving an internal signal generated thereby in response to any of said certain bit groupings, said further input being switched to one of the outputs of said multiplexer during the No. 0 channel of said second frames for modifying a corresponding bit fed to said parallel/series converter.

4. A transmitting section as defined in claim 3 wherein said further input is connected to said switching means through an OR gate also receiving possible alarm signals from a malfunction detector.

5. A transmitting section as defined in claim 2, 3 or 4 wherein said decoding means has a plurality of data inputs connected to respective stage outputs of said series/parallel converter and an enabling input connected to said timing means for receiving the contents of corresponding stages of said series/parallel converter in the presence of said channel-designating signal.

6. A transmitting section as defined in claim 5 wherein said switching means includes a flip-flop settable by a specific bit combination in said corresponding stages for emitting a loop command causing the establishment of a closed circuit within the PCM station between the transmitting section and an associated receiving section thereof.

7. A transmitting section as defined in claim 6 wherein said switching means further includes logic circuitry operable in response to at least one other bit combination in said corresponding stages for emitting a remote-supervision command modifying the operation of a coder receiving the bits sequentially read out from said parallel/series converter and transforming the read-out bits into an outgoing message.

8. A transmitting section as defined in claim 7 wherein said coder is switchable by an independently generated changeover signal between two distinct modes of operation, said logic circuitry including gating means for blocking said changeover signal during at least a major part of a frame in response to said remote-supervision command.

9. A transmitting section as defined in claim 8 wherein said logic circuitry is operable in response to either of two bit combinations detected by said decoding means for establishing a respective mode of operation of said coder during said major part of a frame.

10. A transmitting section as defined in claim 9 wherein said logic circuitry further includes a plurality of cascaded flip-flops.

11. A transmitting section as defined in claim 7, further comprising blanking means enabled by said loop command and inserted between said parallel/series converter and said coder for generating, in response to a particular bit in a predetermined time position of the No. 0 channel of a frame, a series of identical bits to be transformed into said outgoing message.

12. A transmitting section as defined in claim 7 wherein said channel-forming means, said timing means, said decoding means, said switching means and said coder are part of a single integrated-circuit chip.

* * * * *